UNITED STATES PATENT OFFICE.

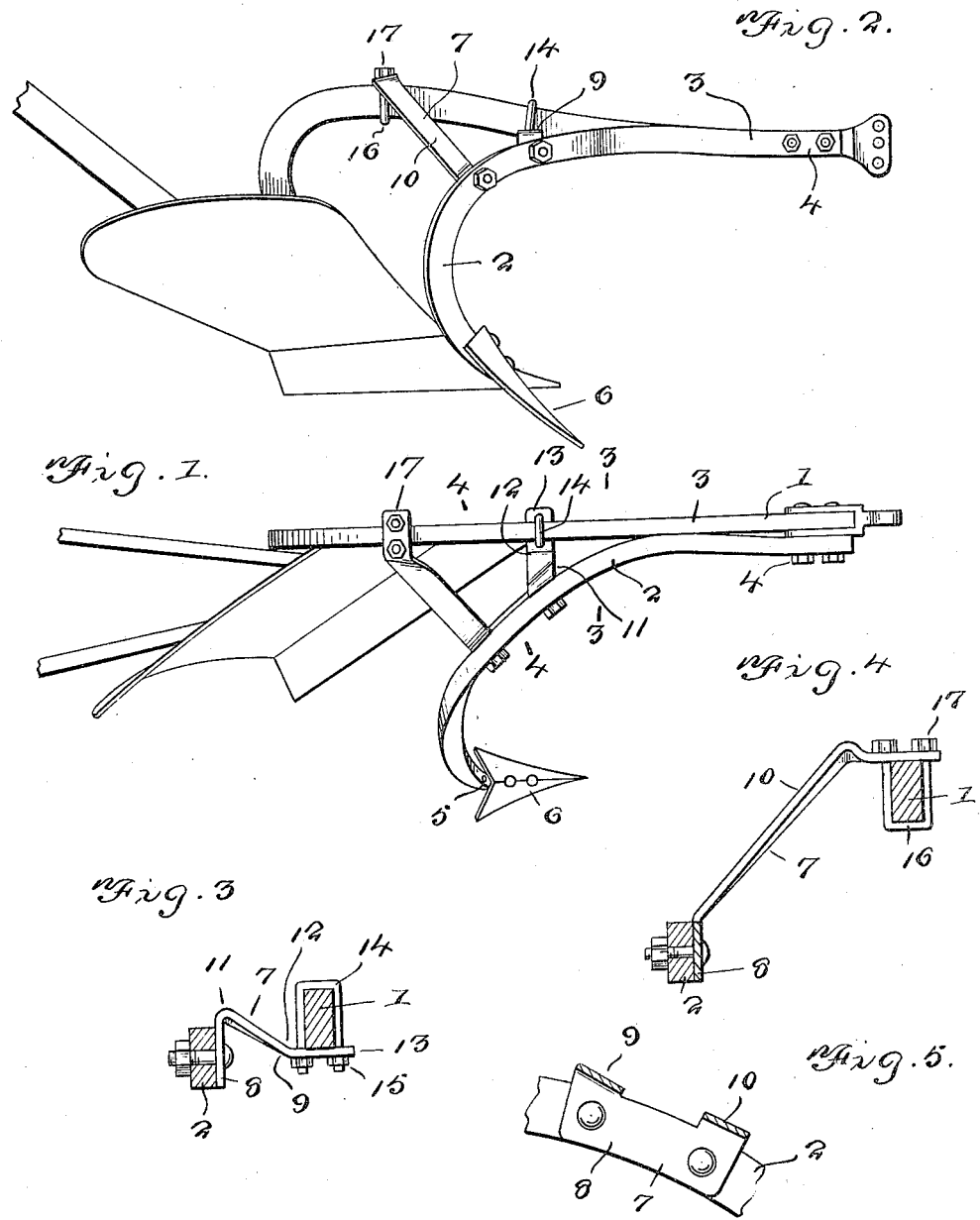

HERSCHELL C. DUNNING, OF WALLONIA, KENTUCKY.

SUBSOILER ATTACHMENT FOR PLOWS.

1,323,032.  Specification of Letters Patent.  Patented Nov. 25, 1919.

Application filed June 14, 1919. Serial No. 304,238.

*To all whom it may concern:*

Be it known that I, HERSCHELL C. DUNNING, a citizen of the United States, residing at Wallonia, in the county of Trigg and State of Kentucky, have invented new and useful Improvements in Subsoiler Attachments for Plows, of which the following is a specification.

The object of my invention is the provision of a sub-soiler attachment, readily attachable to an ordinary moldboard turnplow, and adapted when properly arranged relatively to the plow to efficiently serve the purpose that its name imports.

As illustrated, the attachment is for a right-hand steel-beam plow, but manifestly the attachment may be reversed and used in conjunction with a left-hand plow without in any manner affecting my invention.

To the attainment of the foregoing, the invention consists in the peculiar construction, novel combination and adaptation of parts hereinafter described and definitely claimed. In the accompanying drawings hereby made a part hereof:

Figure 1 is a plan view showing my novel attachment properly arranged relatively to a plow.

Fig. 2 is a side elevation of the same.

Fig. 3 is a transverse section, taken in the plane indicated by the line 3—3 of Fig. 1, looking rearwardly.

Fig. 4 is a similar view on the line 4—4 of Fig. 1, looking rearwardly and showing the intermediate portion 8 of the coupling member in end elevation.

Fig. 5 is a detail section, taken in a diagonal plane extending between the plow-beam and the attachment beam and looking outwardly.

Similar numerals of reference designate corresponding parts in all of the views of the drawings.

The plow illustrated is provided with a beam 1 and is otherwise of the ordinary well known construction.

The beam 2 of my novel attachment is arranged diagonally to the plow-beam and has its forward end portion 3 arranged in lapped relation to the plow beam and fixedly bolted at 4 thereto. The rear portion of the attachment beam 2 is deflected downwardly and forwardly as illustrated, and is provided with three (more or less) apertures 5 for the connection of a shovel 6 that is adapted to move in the furrow made by the previous traverse of the plow.

Interposed between the plow beam 1 and the attachment beam 2 is my novel coupling member 7 which is preferably, though not necessarily, made of steel. The said coupling member is made up of an intermediate portion 8, designed to be arranged lengthwise and flatwise against the inner side of the attachment beam 2, Figs. 1, 3 and 5, a forward arm 9 and a rear arm 10. In the present and preferred embodiment of my invention the forward arm 9 is joined through a loop 11 with the upper edge of the intermediate portion 8 and extends laterally inward and downward and is twisted, as indicated by 12, so that its terminal portion 13 rests transversely under the beam 1. The rear arm 10 extends upwardly and laterally inward from the upper edge of the intermediate portion 8, and is carried across the top of the beam 1. The forward arm 9 is apertured as shown, to receive the threaded legs of a forward shackle 14 that straddles the beam 1 and has nuts 15 on the ends of its legs, whereby it is strongly connected to the forward arm 9, and is adapted to effect rigid and strong connection of the same to the beam 1. The rear arm 10 is apertured as shown, to receive the legs of a rear shackle 16, which shackle is arranged to straddle the beam, and is provided with nuts 17, arranged as shown, so that the rear arm 10 is strongly connected to the shackle 16 and said shackle is enabled to fixedly connect the rear arm 10 to the beam 1.

It will be manifest from the foregoing that my novel attachment is susceptible of being quickly and easily attached to the plow beam, and as readily detached therefrom, without the aid of skilled labor and without the employment of any tools other than an ordinary wrench.

It will also be manifest that the shovel 6 of the sub-soiler attachment is so carried that it will efficiently perform the sub-soiling function.

It will be understood that in the practice of my invention my novel attachment may be made in various sizes according to the plows upon which it is to be used; also, that in a right-hand plow arrangement the shovel 6 on the attachment beam 2 will rest at the right of the plow and in advance of the same, and will be movable in a plane below that of the plow.

Having described my invention, what I claim and desire to secure by Letters-Patent, is:

1. A sub-soiler attachment for plows, comprising a beam adapted at its forward portion for connection with a plow beam, and a coupling member fixed to the attachment beam at an intermediate point in the length thereof and having a forwardly downwardly and inwardly extending lateral arm adapted for disposition at the under side of the plow beam, and to be fixedly connected therewith, and also having an upwardly inwardly and laterally extending arm adapted for disposition above the plow beam and to be fixedly connected therewith.

2. A sub-soiler attachment for plows, comprising a beam adapted at its forward end to be arranged in lapped relation to and fixedly connected with a plow beam and having a downwardly and forwardly deflected rear portion adapted to carry a shovel, a coupling member comprising an intermediate portion arranged in lapped relation at the inner side of the attachment beam, a forward arm joined through a loop with the upper edge of the intermediate portion and extending downwardly and laterally inward and terminating in an apertured transverse portion adapted to rest under and against a plow beam and to receive connecting means, and a rear arm extending laterally and upwardly from the upper edge of the intermediate portion and adapted to rest above and against the plow beam and provided with apertures for the reception of connecting means, and means fixedly connecting the intermediate portion of the coupling member to the attachment beam.

3. The combination of a plow having a beam, a sub-soiler attachment beam diagonally arranged at one side of the plow beam and having its forward portion arranged in lapped relation against the side of the plow beam and fixedly connected thereto and also having its rear portion deflected downwardly and forwardly, a shovel carried by said deflected portion of the attachment beam, and a coupling member interposed between the attachment beam and the plow beam and having an intermediate portion opposed to and fixedly connected with the inner side of the attachment beam and also having forward and rear lateral arms, one arranged transversely below and fixedly connected with the plow beam and the other arranged transversely above and fixedly connected with the plow beam.

In testimony whereof I affix my signature.

HERSCHELL C. DUNNING.